United States Patent [19]

Spietschka et al.

[11] Patent Number: 4,617,403
[45] Date of Patent: Oct. 14, 1986

[54] PROCESS FOR PREPARING A PIGMENT BASED ON 4,4′,7,7′-TETRACHLOROTHIOINDIGO

[75] Inventors: Ernst Spietschka, Idstein; Manfred Urban, Wiesbaden, both of Fed. Rep. of Germany

[73] Assignee: Hoechst Aktiengesellschaft, Fed. Rep. of Germany

[21] Appl. No.: 627,770

[22] Filed: Jul. 5, 1984

[30] Foreign Application Priority Data

Jul. 9, 1983 [DE] Fed. Rep. of Germany ....... 3324879

[51] Int. Cl.$^4$ ................. C07D 333/64; C07D 409/04
[52] U.S. Cl. ................................................... 549/56
[58] Field of Search ........................................ 549/56

[56] References Cited

U.S. PATENT DOCUMENTS

| | | | |
|---|---|---|---|
| 2,158,032 | 6/1938 | Lubs et al. | 549/56 |
| 2,914,539 | 11/1959 | Mory et al. | 549/56 |
| 4,299,966 | 11/1981 | Bien et al. | 549/52 |
| 4,332,955 | 6/1982 | Hoch et al. | 549/56 |

FOREIGN PATENT DOCUMENTS 2825313 12/1979 Fed. Rep. of Germany ........ 549/52

OTHER PUBLICATIONS

Spietschka et al., CA, vol. 98, 1983, 98:145,046c.
Schuetze et al, CA, vol. 98, 1983, 98:55573t.
Hoch et al., CA, vol. 97, 1982, 97:164,535g.
Spietschka et al., CA, vol. 100, 1984, 100:176554f.
Greenwood et al, "Coordination Compounds of Aluminum and Gallium Hydrides" in *Friedel–Crafts and Related Reactions,* ed., Olah, vol. I, pp. 587–588 and 592–593.

*Primary Examiner*—Henry R. Jiles
*Assistant Examiner*—J. G. Mullins
*Attorney, Agent, or Firm*—Connolly and Hutz

[57] ABSTRACT

Process for preparing a strong, non-flocking and rheologically excellent 4,4′,7,7′-tetrachlorothioindigo pigment in high yields and high purity, which comprises (a) reacting 2,5-dichlorophenylthioglycoloyl chloride with Friedel-Crafts catalysts in inorganic acyl halides of medium oxidation state as diluent as temperatures of $-20°$ to $+50°$ C. to 4,7-dichloro-3-oxythionaphthene, (b) oxidizing the resulting 4,7-dichloro-3-oxythionaphthene in a conventional manner to crude 4,4′,7,7′-tetrachlorothioindigo, and (c) treating the crude 4,4′,7,7′-tetrachlorothioindigo obtained in moist form with an aromatic solvent at 80° to 180° C. in the presence of an aqueous alkali solution and a surface-active compound.

5 Claims, No Drawings

PROCESS FOR PREPARING A PIGMENT BASED ON 4,4',7,7'-TETRACHLOROTHIOINDIGO

The invention relates to a process for preparing a strong, non-flocking and rheologically excellent pigment based on 4,4',7,7'-tetrachlorothioindigo by reacting 2,5-dichlorophenylthioglycoloyl chloride with Friedel-Craft catalysts in the presence of inorganic acyl halides of medium oxidation state, as diluents, oxidizing the resulting 4,7-dichloro-3-oxythionaphthene to the unfinished 4,4',7,7'-tetrachlorothioindigo pigment using known methods, and converting said unfinished pigment into the pigment having the abovementioned useful properties by treating the moist unfinished pigment at elevated temperatures with aromatic solvents in the presence of aqueous alkali solution.

4,4',7,7'-Tetrachlorothioindigo, as is known, is an industrially important product which, in industry, is preferably synthesized from 4,7-dichloro-3-oxythionaphthene. Various methods for preparing this starting material are described in the literature:

(a) Reacting 2,5-dichlorophenylthioglycoloyl chloride with aluminum halides, in organic solvents as diluent (U.S. Pat. Nos. 2,158,032 and 2,914,539), which, after decomposition of the aluminum complexes, have to be regenerated in order to meet environmental control regulations.

(b) Adding aluminum chloride to 2,5-dichlorophenylthioglycoloyl halides in the absence of a diluent (German Pat. No. 197,162). This method is difficult to carry out because the course of the reaction is difficult to control and because decomposition products form at the point where the addition is made, as a result of local overheating; it gives only a moderate yield of highly impure 4,7-dichloro-3-oxythionaphthene.

(c) Cyclizing 2,5-dichlorophenylthioglycoloyl chloride which is free of thionyl chloride in a fusion of aluminum chloride, sulfur dioxide and sodium chloride as diluent (German Offenlegungsschrift 2,825,313). This method has the disadvantage that removal or recovery of the sulfur dioxide requires special apparatus which is expensive.

These existing methods for preparing the starting material (4,7-dichloro-3-oxythionaphthene) are unsatisfactory for the stated reasons.

The conversion of 4,7-dichloro-3-oxythionaphthene into crude 4,4',7,7'-tetrachlorothioindigo can be effected using known methods of oxidation:

(1) Oxidation by means of sodium polysulfide (U.S. Pat. No. 2,158,032).

(2) Oxidation by means of air, iron(II) chloride, potassium cyanoferrate(III) or potassium dichromate (German Pat. No. 194,237).

(3) Oxidation by means of the alkali metal salts of aromatic nitrosulfonic acids (German Offenlegungsschrift 3,101,883).

(4) Oxidation by means of peroxodisulfate in aqueous alkaline solution (German Pat. No. 2,504,935).

(5) Oxidation in aqueous alkaline medium by means of air in the presence of copper(II) salt (Example 1 of German Offenlegungsschrift 2,825,313).

The conversion of unfinished 4,4',7,7'-tetrachlorothioindigo pigments obtained using existing methods (German Pat. No. 2,504,935 and German Offenlegungsschrift 3,101,883) into pigment form can be effected in accordance with the two literature references cited above, inter alia by treatment with organic solvents, such as lower alkanols, aliphatic ketones, carboxylic acid esters or aromatic hydrocarbons.

It has now been found, surprisingly, that it is possible to prepare a strong, non-flocking and rheologically excellent 4,4',7,7'-tetrachlorothioindigo pigment in high yield and in high purity by avoiding the disadvantages of existing methods for preparing 4,7-dichloro-3-oxythionaphthene (as described above) and, instead, reacting 2,5-dichlorophenylthioglycoloyl chloride with Friedel-Crafts catalysts in inorganic acyl halides of medium oxidation state, as diluent, at temperatures of $-20°$ to $+50°$ C., preferably $0°$–$30°$ C., oxidizing the resulting 4,7-dichloro-3-oxythionaphthene using known methods to the unfinished 4,4',7,7'-tetrachlorothioindigo pigment, and converting the latter in moist form by treatment with an aromatic solvent, preferably a nitroaromatic, at temperatures of $80°$–$180°$ C. in the presence of an aqueous alkali solution into the pigment having the useful properties.

Examples of suitable Friedel-Crafts catalysts for the first part of the overall reaction, namely for the preparation of 4,7-dichloro-3-oxythionaphthene, are aluminum chloride and aluminum bromide. The inorganic acyl halide of medium oxidation state is preferably thionyl chloride or phosphorus trichloride. The method used in the first part of the reaction has the advantage that it is carried out without added salt or added organic solvent and merely uses a very small amount of aluminum halide and only produces a small amount of sulfur dioxide. A further advantage resides in its simplicity, in particular if thionyl chloride is used as the diluent, since it is already used in preparing the precursor, namely 2,5-dichlorophenylthioglycoloyl chloride, and need not be removed by distillation in a separate process step in the course of processing said precursor into 4,7-dichloro-3-oxythionaphthene (in accordance with the first part of the process according to the invention).

In a preferred embodiment of the first part of the reaction, 1 mole of 2,5-dichlorophenylthioglycoloyl chloride (which may still contain some thionyl chloride from its synthesis) is added dropwise at $0°$–$15°$ C. to a solution or suspension of 1.2 to 1.4 moles of aluminum chloride in 3–12 moles, preferably 3–5 moles, of thionyl chloride. When the reaction is complete, the reaction mixture is poured onto ice-water, decomposing the aluminum complex which has formed, and the resulting 4,7-dichloro-3-oxythionaphthene can then be further reacted in accordance with the invention, to give the crude 4,4',7,7'-tetrachlorothioindigo pigment. However, it is also possible to introduce the 2,5-dichlorophenylthioglycoloyl chloride first and to add to it, in dropwise fashion at $0°$–$15°$ C., the solution or suspension of aluminum chloride in thionyl chloride while preserving the abovementioned molar ratios, and then to proceed as described above.

Depending on the way the reaction was carried out and the decomposition point of the reaction product, the 4,7-dichloro-3-oxythionaphthene obtained as described above can contain small amounts of 4,4',7,7'-tetrachlorothioindigo from which it can be separated by dissolving in an aqueous solution of an alkali metal hydroxide or ammonium hydroxide, filtering the solution to remove undissolved tetrachlorothioindigo, and reprecipitating by acidifying the filtrate. For the conversion of 4,7-di-chloro-3-oxythionaphthene into the 4,4',7,7'-tetrachlorothioindigo pigment, an already existing 4,4',7,7'-tetrachlorothioindigo content is not troublesome, and therefore there is no need for any purification of the abovementioned type.

The conversion of 4,7-dichloro-3-oxythionaphthene into the unfinished 4,4′,7,7′-tetrachlorothioindigo pigment (second part of the process) is effected using one of the known oxidation methods given above.

In the conversion of moist crude 4,4′,7,7′-tetrachlorothioindigo pigment (third part of the process) into the useful pigment, the aromatic solvent can be, for example, chlorobenzene, o-dichlorobenzene, 1,2,4-trichlorobenzene, bromobenzene, toluene, nitrotoluene, xylene or nitrophenol, but in particular nitrobenzene. The aqueous alkali solution can be an aqueous solution of an alkali metal hydroxide, such as sodium hydroxide or potassium hydroxide, ammonia, quaternary ammonium salt or alkali metal carbonate, such as sodium carbonate or potassium carbonate. It is preferable to use an aqueous solution of sodium hydroxide.

The aromatic solvent is advantageously used in 0.1 to 5 times, preferably 0.25 times to twice, the weight of the crude pigment to be treated. The alkali is advantageously used in 4 to 12 times, preferably 6 to 8 times, the amount of the unfinished pigment to be treated, of solid alkali, the alkali being used in the form of a 0.1 - 10 percent by weight, preferably 2.5-7.5 percent by weight, aqueous solution.

The treatment of the unfinished pigment with the aromatic solvent in the presence of aqueous alkali is carried out in the presence of 0.1–10 percent by weight, preferably 0.5–5 percent by weight, of a surface-active compound, relative to the unfinished pigment.

The surface-active compound can be an non-ionic, cationic or in particular anionic compound. The following are suitable surface-active compounds:

(a) Non-ionic compounds, such as fatty alcohol polyglycol ethers, fatty alcohol polyglycol esters or alkylphenol polyglycol ethers.

(b) Cationic compounds, such as ammonium salts, ammonium hydroxides, fatty amine oxyethylates, fatty amine polyglycol ethers or basic colophony derivatives.

(c) Anionic compounds, such as fatty acid taurides, fatty acid N-methyltaurides, fatty acid isothionates, alkylnaphthalenesulfonates, alkylphenylsulfonates, sulfated alkylphenol polyglycol ethoxylates, sulfated fatty alcohol polyglycol ethoxylates, and in particular soaps and resins, i.e. alkali metal salts of fatty acids, naphthenic acids and resin acids, and modified colophony maleate resins or colophony/fumaric acid resins.

In a preferred way of converting the unfinished pigment into the useful pigment (third part of the overall process), the moist press cake of the unfinished pigment obtained by oxidizing 4,7-dichloro-3-oxythionaphthene is stirred with about 7 times the weight of aqueous 5% strength sodium hydroxide solution, 5% resin soap and the single weight of nitrobenzene are then added, the mixture is heated at 100° C. for 3 hours, the nitrobenzene is then distilled off, and the pigment is filtered off, washed until neutral, and dried.

EXAMPLE 1

(a) Ring closure:

70 g of anhydrous aluminum chloride are added to 200 g of initially introduced thionyl chloride. 102 g of 2,5-dichlorophenylthioglycoloyl chloride are added dropwise at 0°–5° C. in the course of 10 minutes, and the mixture is then stirred at 0°–5° C. for 4 hours. The reaction mixture is then poured onto a mixture of 2,400 g of ice and 800 ml of water, and nitrogen is passed into the resulting mixture for 1 hour. The mixture is then filtered with suction, and the filter cake is washed until neutral and dried in vacuo at 50° C. This gives 86.8 g of 92.6% pure 4,7-dichloro-3-oxythionaphthene.

(b) Oxidation (in accordance with German Pat. No. 2,504,935):

66.1 g of 4,7-dichloro-3-oxythionaphthene are dissolved at room temperature in 260.8 g of 7% strength sodium hydroxide solution. A solution of 148 g of water, 38.1 g of 33% strength sodium hydroxide solution and 73.3 g of sodium peroxodisulfate is added dropwise at room temperature in the course of 3 hours. The mixture is then stirred at room temperature for 1 hour, and the crude pigment is then filtered off with suction and washed until neutral.

(c) Finishing:

The press cake of crude pi9ment is adjusted with water to a total weight of 436.6 g. 60 g of 33% strength sodium hydroxide solution, 6 g of 50% strength resin soap and 60 g of nitrobenzene are then added in succession. The mixture is then heated at 100° C. for 3 hours, the nitrobenzene is then distilled off with steam, the residue is filtered with suction, and the filter cake is washed until neutral and dried at 80° C. This gives 60.0 g of pigment which is highly suitable for coloring paints and plastic materials and is distinguished in particular by its high tinctorial strength, its good rheological properties and its non-flocking in paints.

EXAMPLE 2

(a) Ring closure:

70 g of anhydrous aluminum chloride are added to 400 g of initially introduced thionyl chloride. 102 g of 2,5-dichlorophenylthioglycoloyl chloride are added dropwise at 0°–5° C. in the course of 10 minutes, and the mixture is then stirred at 0°–5° C. for 1 hour. The reaction mixture is then poured onto a mixture of 2,400 g of ice and 800 ml of water, and nitrogen is passed into the resulting mixture for 1 hour. The mixture is then filtered with suction, and the filter cake is washed until neutral and dried in vacuo at 50° C. This gives 87.2 g of 90.9% pure 4,7-dichloro-3-oxythiónaphthene.

(b) Oxidation: is carried out as described in Example 1(b).

(c) Finishing: is carried out as described in Example 1(c).

The result is 59.6 g of pigment which is highly suitable for coloring paints and plastic materials and is distinguished in particular by its high tinctorial strength, its good rheological properties and its non-flocking in paints.

EXAMPLE 3

(a) Ring closure:

70 g of anhydrous aluminum chloride are added to 200 g of initially introduced thionyl chloride. 102 g of 2,5-dichlorophenylthioglycoloyl chloride are added dropwise at 40° C. in the course of 10 minutes, and the mixture is then stirred at 40° C. for 1 hour. The reaction mixture is then poured onto a mixture of 2,400 g of ice and 800 ml of water, and nitrogen is passed into the resulting mixture for 1 hour. The mixture is then filtered with suction, and the filter cake is washed until neutral and dried fed in vacuo at 50° C. This gives 91.4 g of 90.9% pure 4,7-dichloro-3-oxythionaphthene.

(b) Oxidation: is carried out as described in Example 1(b).

(c) Finishing: is carried out as described in Example 1(c).

The result is 59.5 g of p.igment which is highly suitable for coloring paints and plastic materials and is distinguished in particular by its high tinctorial strength, its good rheological properties and its non-flocking in paints.

EXAMPLE 4

(a) Ring closure:

94.8 g of 2,5-dichlorophenylthioglycolic acid are added to 103.2 g of thionyl chloride. 0.24 g of N-methylpyrrolidone is added, and the mixture is heated at 50° C. for 2 hours and is then cooled down to 0° C. At this temperature the 2,5-dichlorophenylthioglycoloyl chloride formed is then added dropwise in the course of 1 hour to a suspension of 160 g of thionyl chloride and 77.2 g of anhydrous aluminum chloride. The suspension is stirred at 0°–5° C. for 1 hour and is then poured onto a mixture of 1,200 g of ice and 800 ml of water, the resulting mixture is stirred at 80° C. for 1 hour and is then filtered with suction, and the filter cake is washed until neutral and dried in vacuo at 50° C. This gives 88.4 g of 94.5% pure 4,7-dichloro-3-oxythionaphthene.

(b) Oxidation: is carried out as described in Example 1(b).

(c) Finishing: is carried out as described in Example 1(c).

The result is 60.1 g of pigment which is highly suitable for coloring paints and plastic materials and is distinguished in particular by its high tinctorial strength, its good rheological properties and its non-flocking in paints.

EXAMPLE 5

(a) Ring closure: is carried out as described in Example 1(a).

(b) Oxidation (in accordance with Example 1 of German Offenlegungsschrift No. 2,825,313):

72 g of 4,7-dichloro-3-oxythionaphthene are added to a solution of 748 g of demineralized water and 150 g of 33% strength sodium hydroxide solution, the mixture is heated to 80° C., a solution of 2 g of crystalline copper sulfate in 10 g of water is then added, air is passed in until oxidation is complete, the mixture is filtered hot with suction, and the filter cake is washed until neutral.

(c) Finishing: is carried out as described in Example 1(c).

The result is 60.4 g of pigment which is highly suitable for coloring paints and plastic materials and has greater hiding power and is bluer than the pigment obtained in Example 1.

EXAMPLE 6

(a) Ring closure: is carried out as described in Example 1(a).

(b) Oxidation (in accordance with German Offenlegungsschrift No. 3,101,883):

72 g of 4,7-dichloro-3-oxythionaphthene are added to and dissolved in a solution of 230 g of water and 100 g of 33% strength sodium hydroxide solution. 36 g of sodium 3-nitrobenzenesulfonate are added, the mixture is heated at 60° C. for 2 hours and filtered with suction, and the filter cake is washed until neutral.

(c) Finishing: is carried out as described in Example 1(c).

The result is 53.6 g of pigment which is highly suitable for coloring paints and plastic materials and is darker and bluer than the pigment obtained in Example 1.

EXAMPLE 7

(a) Ring closure: is carried out as described in Example 1(a).

(b) Oxidation (in accordance with German Pat. No. 194,237):

72 g of 4,7-dichloro-3-oxythionaphthene are added to and dissolved in a solution of 420 g of water and 182 g of 33% strength sodium hydroxide solution. 1,650 g of 10% strength potassium ferricyanide solution are added dropwise at 15°–20° C. in the course of 5 hours. The product is then filtered off with suction and washed until neutral.

(c) Finishing: this is carried out as described in

Example 1(c).

The result is 60.8 g of pigment which is highly suitable for coloring paints and plastic materials and is distinguished in particular by its high tinctorial strength, its good rheological properties and its non-flocking in paints.

EXAMPLE 8

(a) Ring closure: is carried out as described in Example 1(a).

(b) Oxidation (in accordance with U.S. Pat. No. 2,158,032):

28.8 g of 4,7-dichloro-3-oxythionaphthene are added to a solution of 1,400 g of water and 140 g of 33% strength sodium hydroxide solution, and the mixture is heated to 80° C. 113.5 g of 45% strength sodium polysulfide solution are then added dropwise at this temperature. The mixture is then stirred at 80° C. for 1 hour, and the unfinished pigment is filtered off with suction and washed until neutral.

(c) Finishing: is carried out as described in Example 1(c).

The result is 24.2 g of pigment which is highly suitable for coloring paints and plastic materials and is darker and bluer than the pigment obtained in Example 1.

EXAMPLE 9

(a) Ring closure: is carried out as described in Example 1(a).

(b) Oxidation: is carried out as described in Example 1(b).

(c) Finishing:

The press cake of unfinished pigment is adjusted with water to a total weight of 436.6 g. 30 g of 33% strength sodium hydroxide solution, 6 g of 50% strength resin soap and 60 g of nitrobenzene are then added in succession. The mixture is then heated to 100° C. for 3 hours, the nitrobenzene is then distilled off with steam, the residue is filtered with suction, and the filter cake is washed until neutral and dried at 80° C.

This gives 59.4 g of pigment which is highly suitable for coloring paints and plastic materials and is distinguished in particular by its high tinctorial strength, its good rheological properties and its non-flocking in paints.

EXAMPLE 10

(a) Ring closure: is carried out as described in Example 1(a).

(b) Oxidation: is carried out as described in Example 1(b).

(c) Finishing:

The press cake of unfinished pigment is adjusted with water to a total weight of 436.6 g. 90 g of 33% strength sodium hydroxide solution, 6 g of 50% strength resin soap and 60 g of nitrobenzene are then added in succession. The mixture is then heated to 100° C. for 3 hours, the nitrobenzene is then distilled off with steam, the residue is filtered with suction, and the filter cake is washed until neutral and dried at 80° C.

This gives 58.6 g of pigment which is highly suitable for coloring paints and plastic materials and is distinguished in particular by its high tinctorial strength, its good rheological properties and its non-flocking in paints.

EXAMPLE 11

(a) Ring closure: is carried out as described in Example 1(a).

(b) Oxidation: is carried out as described in Example 1(b).

(c) Finishing:

The press cake of unfinished pigment is adjusted with water to a total weight of 436.6 g. 60 g of 33% strength sodium hydroxide solution, 1 g of 50% strength resin soap and 60 g of nitrobenzene are then added in succession. The mixture is then heated to 100° C. for 3 hours, the nitrobenzene is then distilled off with steam, the residue is filtered with suction, and the filter cake is washed until neutral and dried at 80° C.

This gives 58.3 g of pigment which is highly suitable for coloring paints and plastic materials and is distinguished in particular by its high tinctorial strength, its good rheological properties and its non-flocking in paints.

EXAMPLE 12

(a) Ring closure: is carried out as described in Example 1(a).

(b) Oxidation: is carried out as described in Example 1(b).

(c) Finishing:

The press cake of unfinished pigment is adjusted with water to a total weight of 436.6 g. 60 g of 33% strength sodium hydroxide solution, 6 g of 50% strength resin soap and 15 g of nitrobenzene are then added in succession. The mixture is then heated to 100° C. for 3 hours, the nitrobenzene is then distilled off with steam, the residue is filtered off with suction, and the filter cake is washed until neutral and dried at 80° C.

This gives 58.4 g of pigment which is highly suitable for coloring paints and plastic materials and is distinguished in particular by its high tinctorial strength, its good rheological properties and its non-flocking in paints.

EXAMPLE 13

(a) Ring closure: is carried out as described in Example 1(a).

(b) Oxidation: is carried out as described in Example 1(b).

(c) Finishing:

The press cake of unfinished pigment is adjusted with water to a total weight of 436.6 g. 60 g of 33% strength sodium hydroxide solution, 6 g of 50% strength resin soap and 180 g of nitrobenzene are then added in succession. The mixture is then heated to 100° C. for 3 hours, the nitrobenzene is then distilled off with steam, the residue is filtered off with suction, and the filter cake is washed until neutral and dried at 80° C.

This gives 56.2 g of pigment which is highly suitable for coloring paints and plastic materials and is distinguished in particular by its high tinctorial strength, its good rheological properties and its non-flocking in paints.

EXAMPLE 14

(a) Ring closure: is carried out as described in Example 1(a).

(b) Oxidation: is carried out as described in Example 1(b).

(c) Finishing:

The press cake of unfinished pigment is adjusted with water to a total weight of 436.6 g. 60 g of 33% strength sodium hydroxide solution, 6 g of 50% strength resin soap and 60 g of nitrobenzene are then added in succession. The mixture is then heated to boiling at 100° C. for 3 hours, the nitrobenzene is then immediately distilled off with steam, the residue is filtered off with suction, and the filter cake is washed until neutral and dried at 80° C.

This gives 58.4 g of pigment which is highly suitable for coloring paints and plastic materials and is distinguished in particular by its high tinctorial strength, its good rheological properties and its non-flocking in paints.

EXAMPLE 15

(a) Ring closure: is carried out as described in Example 1(a).

(b) Oxidation: is carried out as described in Example 1(b).

(c) Finishing:

The press cake of unfinished pigment is adjusted with water to a total weight of 436.6 g. 60 g of 33% strength sodium hydroxide solution, 6 g of 50% strength resin soap and 60 g of nitrobenzene are then added in succession. The mixture is then heated at 125° C. in an autoclave for 3 hours, the nitrobenzene is distilled off with steam, and the product is filtered off with suction, washed until neutral and dried at 80° C.

This gives 55.7 g of pigment which is highly suitable for coloring paints and plastic materials and is distinguished in particular by its high tinctorial strength, its good rheological properties and its non-flocking in paints and has greater hiding power than the pigment obtained in Example 1.

EXAMPLE 16

(a) Ring closure: is carried out as described in Example 1(a).

(b) Oxidation: is carried out as described in Example 1(b).

(c) Finishing:

The press cake of unfinished pigment is adjusted with water to a total weight of 436.6 g. 60 g of 33% strength sodium hydroxide solution, 6 g of 50% strength resin soap and 60 g of nitrobenzene are then added in succession. The mixture is heated at 100° C. for 3 hours, the nitrobenzene is distilled off with steam, the mixture is cooled down to 25° C., 47.6 g of sodium hypochlorite solution are added, and the mixture is stirred at 25° C. until the sodium hypochlorite solution has been consumed. The product is then filtered off with suction, washed until neutral, and dried at 80° C.

This gives 55.9 g of pigment which is highly suitable for coloring paints and plastic materials and is distinguished in particular by its high tinctorial strength, its good rheological properties and its non-flocking in paints and is redder than the pigment obtained in Example 1.

We claim:

1. A process for preparing a strong, non-flocking and rheologically excellent 4,4′,7,7′-tetrachlorothioindigo pigment in high yields and high purity, which comprises
   (a) reacting 2,5-dichlorophenylthioglycoloyl chloride with Friedel-Crafts catalysts in inorganic acyl halides of medium oxidation state as diluent pt temperatures of −20° to +50° C. to 4,7-dichloro-3-oxythionaphthene,
   (b) oxidizing the resulting 4,7-dichloro-3-oxythionaphthene in a conventional manner to crude 4,4′,7,7′-tetrachlorothioindigo, and
   (c) treating the crude 4,4′,7,7′-tetrachlorothioindigo obtained in moist form with an aromatic solvent at 80° to 180° C. in the presence of an aqueous alkali solution and a surface-active compound.

2. The process as claimed in claim 1, wherein the Friedel-Crafts catalyst used is aluminum chloride or aluminum bromide, and the acyl halide of medium oxidation state (diluent) is thionyl chloride or phosphorus trichloride, and the reaction is carried out at a temperature of 0° to 30° C.

3. The process as claimed in claim 1, wherein 1 mole of 2,5-dichlorophenylthioglycoloyl chloride is reacted at 0°–15° C. with a solution or suspension of 1.2 to 1.4 moles of aluminum chloride in 3–5 moles of thionyl chloride.

4. The process as claimed in claim 1, wherein, in said step (c), the aromatic solvent can be chlorobenzene, o-dichlorobenzene, 1,2,4-trichlorobenzene, bromobenzene, toluene, nitrotoluene, xylene, nitrophenol or nitrobenzene, the aqueous alkali solution can be an aqueous solution of sodium hydroxide, potassium hydroxide, ammonia, quaternary ammonium salt, sodium carbonate or potassium carbonate, and the surface-active compound can be a non-ionic, cationic or anionic compound.

5. The process as claimed in claim 1, wherein the process is carried out substantially without any organic solvent being present during the said step (a), and essentially the sole diluent for the reaction of said step (a) is thionyl chloride or phosphorus trichloride.

* * * * *

UNITED STATES PATENT AND TRADEMARK OFFICE
CERTIFICATE OF CORRECTION

PATENT NO. : 4,617,403

DATED : October 14, 1986

INVENTOR(S) : SPIETSCHKA ET AL

It is certified that error appears in the above-identified patent and that said Letters Patent is hereby corrected as shown below:

In the Abstract: (item [57] on the cover sheet of the patent), line 6, "as" (second occurrence) should read -- at --.

In claim 1, column 9, line 14, "pt" should read -- at --.

In claim 4, column 10, line 14, "aqUe-" should read -- aque- --.

Signed and Sealed this

Seventeenth Day of February, 1987

Attest:

DONALD J. QUIGG

Attesting Officer     Commissioner of Patents and Trademarks